(12) United States Patent
Wimmer et al.

(10) Patent No.: US 7,282,657 B2
(45) Date of Patent: Oct. 16, 2007

(54) ASSEMBLY HAVING AN ELECTRIC SWITCHING FUNCTION AS WELL AS A METHOD OF PRODUCING SUCH AN ASSEMBLY

(75) Inventors: Walter Wimmer, Weikertschlag/Thaya (AT); Robert Pollmann, Karlstein/Thaya (AT)

(73) Assignee: Pollmann Austria OHG, Karlstein/Thaya (AT)

( * ) Notice: Subject to any disclaimer, the term of this patent is extended or adjusted under 35 U.S.C. 154(b) by 0 days.

(21) Appl. No.: 11/371,789

(22) Filed: Mar. 9, 2006

(65) Prior Publication Data

US 2006/0207868 A1 Sep. 21, 2006

(30) Foreign Application Priority Data

Mar. 18, 2005 (AT) ................ A 461/2005

(51) Int. Cl.
*H01H 13/26* (2006.01)

(52) U.S. Cl. ................ 200/302.2; 200/302.1

(58) Field of Classification Search .. 200/302.1–302.3, 200/512–520, 310–315
See application file for complete search history.

(56) References Cited

U.S. PATENT DOCUMENTS

| | | | | | |
|---|---|---|---|---|---|
| 3,115,555 | A | * | 12/1963 | Lescarboura | ................ 200/5 R |
| 3,316,379 | A | * | 4/1967 | Clarke et al. | ................ 200/333 |
| 3,827,786 | A | * | 8/1974 | Macher | ................ 359/683 |
| 3,940,585 | A | * | 2/1976 | Schaad | ................ 200/530 |
| 4,081,632 | A | * | 3/1978 | Schaffeler | ................ 200/6 BB |
| 4,766,272 | A | * | 8/1988 | Guzzon | ................ 200/302.2 |
| 4,975,548 | A | * | 12/1990 | Brouilette et al. | ................ 200/5 R |
| 5,311,656 | A | * | 5/1994 | Eldershaw | ................ 29/622 |
| 5,594,220 | A | * | 1/1997 | Hackbarth et al. | ................ 200/6 B |
| 6,573,466 | B1 | * | 6/2003 | Rapp et al. | ................ 200/302.3 |
| 6,626,473 | B1 | * | 9/2003 | Klein et al. | ................ 292/347 |
| 6,635,838 | B1 | * | 10/2003 | Kornelson | ................ 200/341 |
| 6,930,261 | B2 | * | 8/2005 | Nakade | ................ 200/16 D |
| 6,972,385 | B2 | * | 12/2005 | Krebs et al. | ................ 200/1 B |
| 7,012,208 | B2 | * | 3/2006 | Wang | ................ 200/341 |
| 7,145,091 | B1 | * | 12/2006 | Wang | ................ 200/302.3 |

FOREIGN PATENT DOCUMENTS

DE 3316379 A1 * 11/1984
DE 3827786 A1 * 2/1989

* cited by examiner

*Primary Examiner*—Elvin Enad
*Assistant Examiner*—Lisa Klaus
(74) *Attorney, Agent, or Firm*—Ladas & Parry LLP

(57) ABSTRACT

An assembly having an electric switching function, comprises a switch device which has associated electric conductors and a movable actuating part, on which a hood member is mounted, and which is provided in a housing comprised by an outer injection-molded body; the hood member has its rim resting on a first injection-molded synthetic material body that fixes and partially encloses the electric conductors, and is sealingly connected to the first injection-molded synthetic material body by means of the outer, second injection-molded synthetic material body that both covers the rim of the hood member and also adjoins the first injection-molded synthetic material body.

26 Claims, 14 Drawing Sheets

ASSEMBLY HAVING AN ELECTRIC SWITCHING FUNCTION AS WELL AS A METHOD OF PRODUCING SUCH AN ASSEMBLY

FIELD OF THE INVENTION

The invention relates to an assembly having an electric switching function, as well as to a method of producing such an assembly having an-electric switching function.

BACKGROUND OF THE INVENTION

It has been known (cf. e.g. AT 410 728 B) to realize switching assemblies, in which conductive tracks or conductive track foils are embedded in a synthetic material so as to achieve a water-tight structure, in combination with micro-switches, wherein the microswitches are mounted as such, i.e. as pre-fabricated components, and connected to the conductive tracks. To obtain a water-tight design, either additional sealing or additional casting with casting mass is necessary, rendering both the structure and the production of these assemblies comparatively complex.

On the other hand, in DE 36 21 613 A1, a type of construction for a contact switch is disclosed, where pre-fabricated assemblies are arranged within one another. To the actuating part of the contact switch, a hood-like sealing member is fastened, and this sealing member, with a thickened bead thereof, is inserted in a groove of a housing member. This known type of switch construction is complex, too, while reliable sealing is not ensured. Similar considerations also hold for the push-button switch according to DE 88 17 202.3 U, in which an interior sealing membrane is provided to seal, in fluid-tight manner, an inner chamber of a housing member in which electric contacting is made. Here again, complicated mounting of individual parts is required for producing the push-button switch.

SUMMARY OF THE INVENTION

It is now an object of the invention to avoid the disadvantages of the known types of construction and to provide an assembly having an electric switching function, as well as a method of producing such an assembly, with a simple and inexpensive production being possible, while nevertheless, a tightly sealed, in particular a moisture-proof, design of the assembly shall be obtainable in a simple manner.

In the technique according to an aspect of the invention, two injection-molding steps are provided, wherein in a first injection-molding step, a first injection-molded synthetic material body is produced, in particular of a thermoplastic resin, which is injected around the electric conductors which, during switching, are to be connected with each other or to be separated from each other; these conductors preferably are punched-out conductive tracks made of a metal plate or foil, in particular of copper or, more precisely, of a copper alloy, as is conventional per se. In doing so, the electric conductors are fixed in their positions relative to each other, and a manipulatable body is obtained as a preliminary product, on which the mechanical parts of the switching device and the hood can be mounted before, finally, a second injection-molding step, the finishing injecting-around is effected, preferably also with a thermoplastic resin, so as to complete the assembly. Preferably, the switching device includes a simple strip or tongue-shaped switching spring, e.g. made of bronze or the like metal, which is mounted on the first injection-molded synthetic material body, prior to the second injection-molding step, wherein, after having mounted the switching spring, the hood, on which the actuating part which, in particular is plunger or piston-shaped, of the switching device has been pre-mounted, is arranged on the first injection-molded synthetic material body.

Instead of using separate electric conductors, or conductive tracks, respectively, it is, of course, also conceivable to use a printed circuit board or a conductive track foil comprising the respective conductive tracks and made of a substrate covered by a conductive material, and to first embed them in synthetic material in said first injection-molding step so as to obtain a body which is ideally suited for the mounting of further components. In this case, the conductive tracks are first produced ("structured") in a per se conventional manner on the substrate by photo-etching techniques.

For the hood member, an elastomer or a thermoplastic elastomer may be used, and this is particularly advantageous if the hood member is deformed during actuation of the switch device of the assembly. In this connection, it is also suitable if the hood member includes an aperture through which the actuating part sealingly projects to the exterior. In this manner, the actuating part is directly accessible for an actuation of the switch device, the advantageous direct mechanical actuation, or force impact, respectively, on the actuating part, without the hood member being interposed, being possible, which is of particular advantage for many applications, such as in the field of motor vehicles, where the present switching assembly can be used with particular advantage. In this way, an early wear of the hood member by a mechanical component driving the actuating part and, thus, triggering the switching function, is prevented. In order to ensure an appropriate sealing, it is advantageously provided for the piston- or plunger-like actuating part to have a groove extending around its periphery, the hood member engaging into said groove with the rim of the aperture under sealing contact.

For a simple structure and mode of production, it is also advantageous if the first injection-molded synthetic material body forms a guide for the actuating part. There, it is furthermore suitable, if the actuating part includes a bridge-shaped guiding portion which is non-round, seen in top view, and the guide is interrupted in alignment to the space under the bridge. In this way, an exact guidance of the actuating part during actuation of the switch, on the one hand, and good cooperation in a simple manner with a switching spring of the switch device, on the other hand, is rendered possible; in this connection, accordingly, it is advantageous if the first injection-molded synthetic material body forms a receiving means or seat for a metallic switching spring of the switch device; and it is further advantageous if the switching spring projects freely cantilevering from its receiving means through the passage in the guide formed by the interruption, where at least one of the electric conductors can be contacted.

Furthermore, a simple embodiment is obtained here if the switching spring, by means of its part that is located in the receiving means, is electrically connected to another one of the conductors; thus, here the part of the switching spring which is contained in the receiving means forms the "switch root".

For a reliable operation of the switch device over extended periods of operation, it is furthermore suitable if the switching spring by means of a convex portion thereof abuts on the lower side of the bridge-shaped guiding portion. To obtain a good contact with the respective conductor, it is also advantageous if the switching spring at its freely cantilevering end has at least one curved portion.

For a sudden, immediate switching or switching over, it is advantageous if the switching spring comprises an arched portion which, when actuated by the actuating part, is capable of being snapped over when having reached a dead center. Here, it is furthermore suitable if one end of the tongue-shaped arched portion of the switching spring is supported on a supporting projection.

With a view to a reliable contacting, it is also advantageous if the switching spring has a separate switching knob at its switching end. Furthermore, it is suitable if the switching spring has a coating of noble metal, preferably gold.

For a simple mounting, it is advantageous if the hood member and the actuating part are integrally formed in one piece, preferably as a two-component injection-molded part. Moreover, for returning the switch device into a pre-determined at-rest position, it is advantageous if the actuating part has an associated return spring, preferably a helical compression spring surrounding the actuating part and resting on the first injection-molded synthetic material body, on the one hand, and on the actuating part, or on a part fixedly connected thereto, e.g. the hood member, respectively, on the other hand.

As has already been mentioned, during the first injection-molding step, the guide for the switch actuating part and/or the receiving means for the switching spring suitably are co-injection-molded. Besides, the first injection-molded synthetic material body may be substantially plate-shaped, and it may be produced with protruding projections which will be used as spacer elements during the second injection-molding step, so as to keep the first injection-molded synthetic material body and parts mounted thereon, at least with one side thereof at a distance from the neighboring walls of the injection-molding tool. Similar projections can also be injection-molded for positioning of the hood member during the pre-mounting procedure.

During the second injection-molding step, finally, a housing having a bottom, side walls and a cover wall can be produced for the assembly, wherein the cover wall has an aperture through which the hood member and the actuation part held by the former project. The electric conductors to be connected with each other or separated from each other by the switch device can project from this housing at any desired site thereof, e.g. on one side thereof. Furthermore, the housing may also include a region for fixing the assembly to an appropriate carrier or basis structure.

BRIEF DESCRIPTION OF THE DRAWINGS

The invention will now be further explained by way of preferred exemplary embodiments illustrated in the drawings, to which, however, it shall not be restricted. Therein.

DESCRIPTION OF THE PREFERRED EMBODIMENTS

Figure 1:
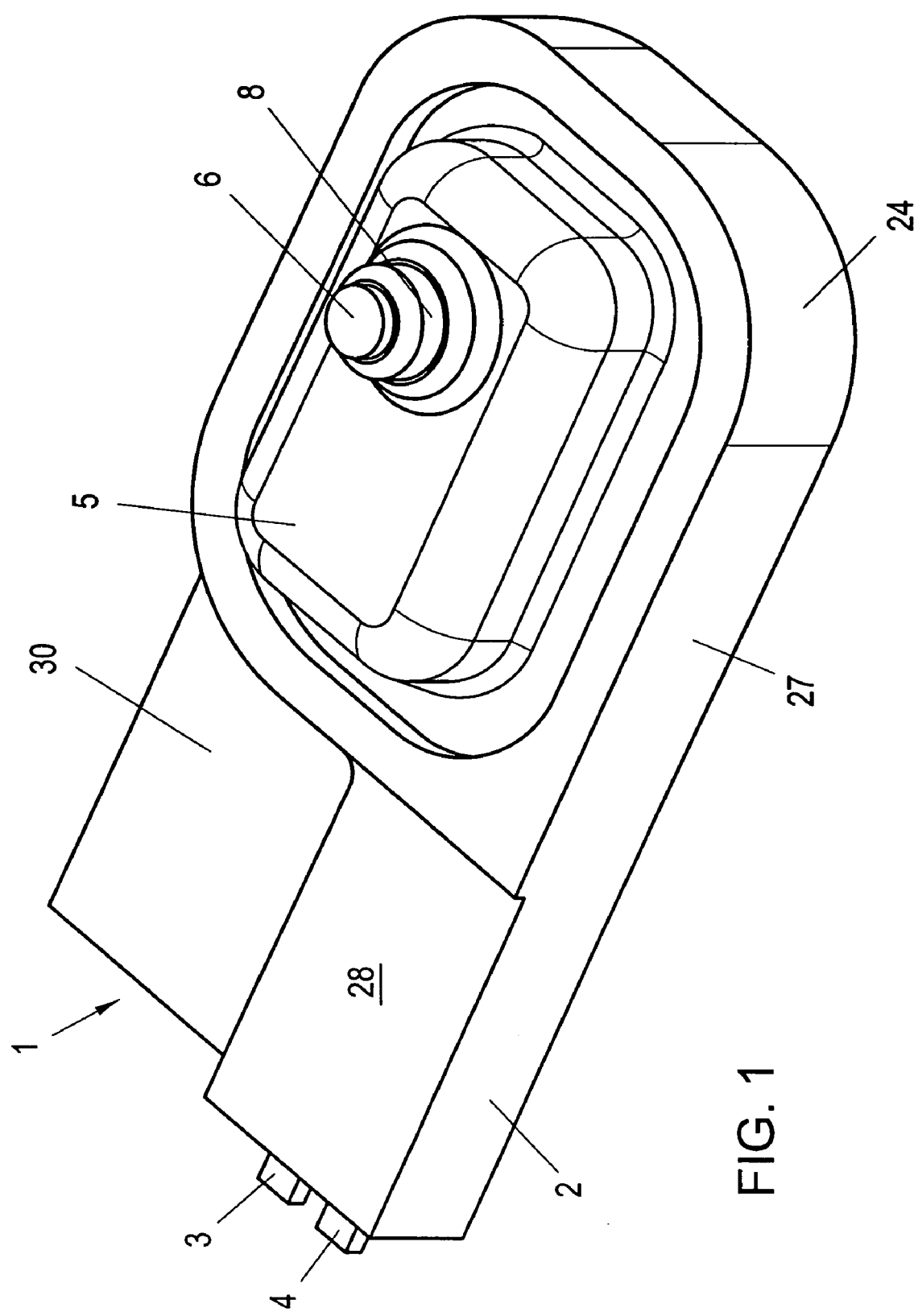
FIG. 1 shows a perspective view of an assembly having electric switching function, according to the invention.

In FIG. 1, an assembly having an electric switching function, also termed "switch assembly" or "assembly" in short hereinafter, and at least at present being most preferred, is quite generally is denoted by 1. This switch assembly 1 has a synthetic material housing 2, from which electric conductors 3, 4 protrude at one side wall 2 thereof. On the upper side of the assembly 1, a hood member 5 is provided which embraces a piston- or plunger-like actuating part 6 of the assembly 1, more precisely of an electric switch device 7 proper contained underneath the hood member 5 in the assembly 1 and visible in FIG. 2.

Figure 3:
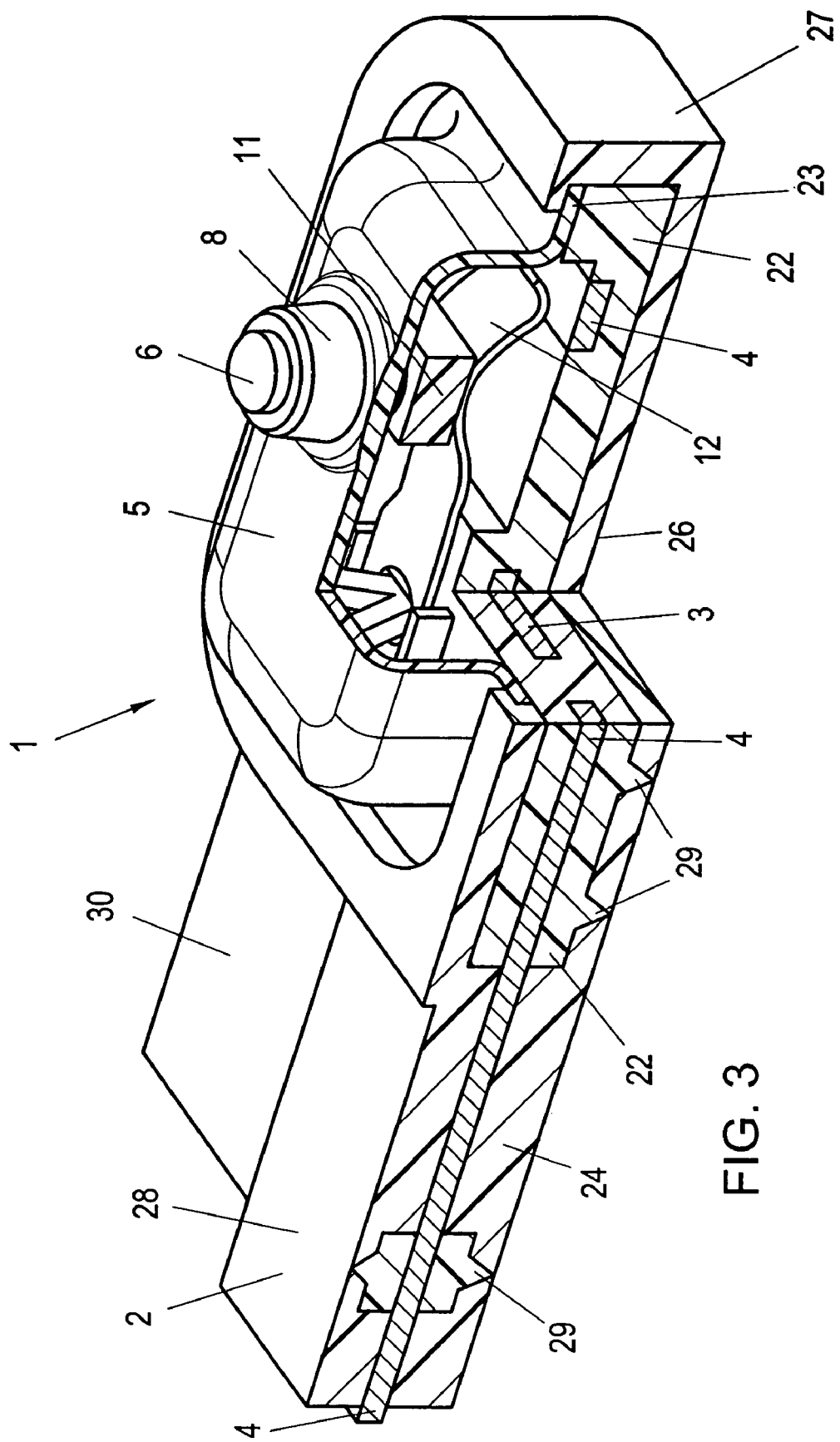
FIG. 3 shows a perspective, partially sectioned illustration of an assembly according to FIGS. 1 and 2.
Figure 4:
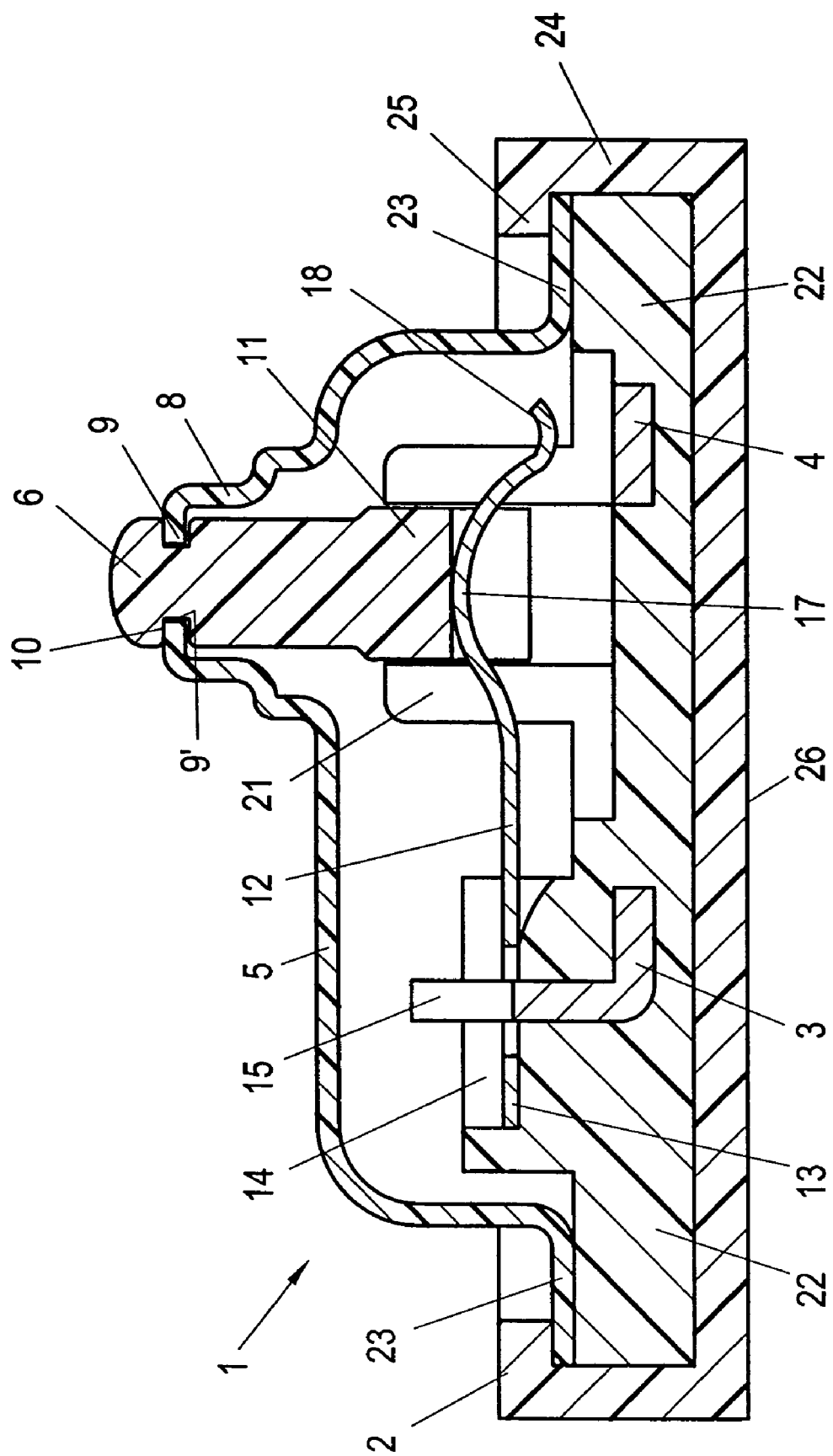
FIGS. 4 and 5 each show sectional illustrations through the region of the assembly where the switch device is accommodated, i.e. in a state in which the switch is open (FIG. 4), and in a state in which the switch is "closed" (FIG. 5), wherein in FIG. 5 a few alternatives of structural details have been shown for the sake of simplicity.
Figure 5:
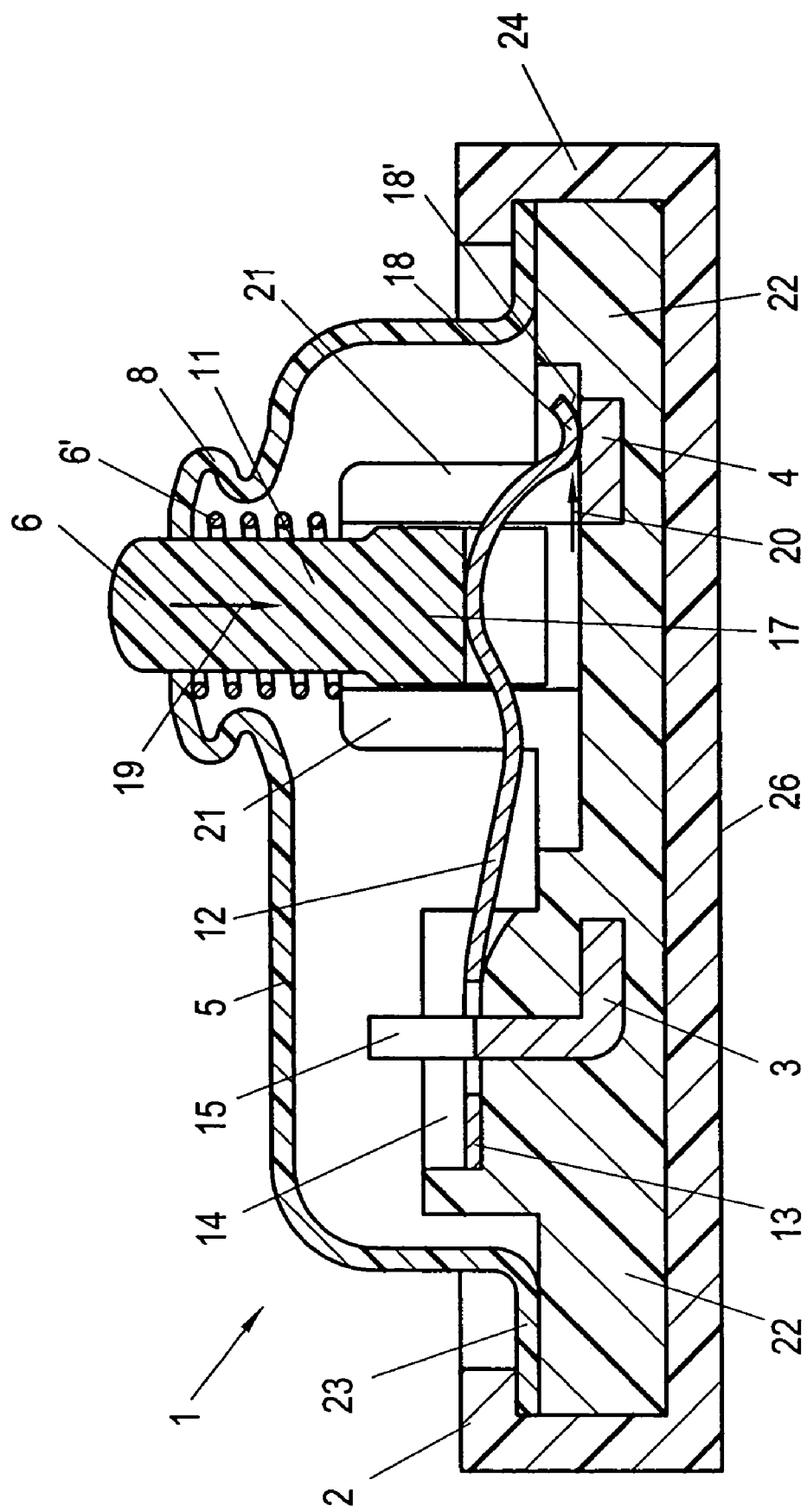

As can be seen from FIGS. 1 and 3 and, in particular, also from FIGS. 4 and 5, the hood member 5 has a cylindrical or cupola-shaped projection 8 with an upper aperture 9', the rim 9 of which engaging into a groove 10 of the actuating part 6, abutting therein under pressure. This sealing abutment under pressure is achieved in that the aperture 9' delimited by rim 9 is somewhat smaller than the cross-section of the actuating part 6, as it is defined through the bottom of the groove 10 in the region of this aperture 9'.

On its lower base, the actuating part 6 includes a bridge-type guiding and compressing portion 11, which serves for guiding the actuating part 6 during its movement when actuating the switch, on the one hand, and effects the switch actuation proper, on the other hand, by bending a switching spring 12; this switching spring 12 is strip shaped and made of metal, in particular bronze, e.g. punched out, and seen in section, it has a special configuration that can be seen from FIGS. 4 and 5.

In detail, the switching spring 12 has a rear, wider part thereof, called fastening part 13, which is held in a receiving means or seat 14, two divergent arms 15 of the one conductor, e.g. of conductor 3, being used for retaining purposes (cf. FIGS. 2 and 4); these two arms 15 project through an aperture 16 in the fastening part 13 of the switching spring 12 and then extend divergently to thus maintain the switching spring 12 in a positive fit, with the widened rear fastening part 13 within the receiving means 14. For this positive fit, moreover, the fastening part 13 has a rectangular design seen in top view, corresponding to the receiving means 14, so as to prevent rotation of the switching spring 12 in its plane. The strip part or tongue part of the switching spring 12, which part freely cantilevers from the fastening part 13, is, after a straight portion, bent upwards so as to form a convex portion 17 in abutment on the lower side of the bridge-shaped guiding portion 11 of the actuating part 6. Following thereon, the switching spring 12 is bent to a curved contact portion 18 at its end, cf. FIG. 4. In the example illustrated, this curved portion 18 at the end of the switching spring 12 is simply bent to be concave, and during the downward movement of the actuating part 6 it can be moved downwards, cf. arrow 19 in FIG. 5, with the switching spring 12 deforming, particularly in its region between the rear fastening part 13 and the convex engagement portion 17. The concave end portion 18 thus will move in longitudinal direction according to arrow 20 in FIG. 5, whereby it contacts a part of another conductor, e.g. conductor 4, thereby providing the electric connection between the conductors 3 and 4 via the contact spring 12. During the downward movement of the actuating part 6, the cupola-shaped projection 8 of the hood member 5 is somewhat compressed, i.e. as a consequence of the engagement of the aperture rim 9 in groove 10 of the actuating part 6.

Returning of the actuating part 6 from the closing position according to FIG. 5, into the open position according to FIG. 4, apart from the elasticity of the switching spring 12, is also ensured by the elasticity of the hood member 5, or of the projection 8, respectively; this hood member 5 is made of a thermoplastic elastomer, e.g. (TPE, e.g. TPE-E or TPE-V), or of another elastomer (e.g. NBR—acrylonitrile-butadien-ecaoutchouc; CR—chlorobutadiene caoutchouc or polychloroprene caoutchouc; EPDM—ethylene-propylene-diene caoutchouc; CSM—chlorosulfonated polyethylene). The piston 6 may also be made of a synthetic material, in particular of a thermoplastic resin (e.g. PET, PA, POM, ABS, PMMA, etc.). Optionally, of course, also a return spring may be arranged for returning the hood member 5, or the projection 8, respectively, and thus, the actuating part 6 between the upper side of the projection 8, neighboring the rim 9 of the aperture 9', and a guide 21 guiding the guiding portion 11 in the interior of the assembly; this could be a conventional helical compression spring made of metal or of a synthetic material. Such a return spring 6' having the form of a helical compression spring is shown by way of example in FIG. 5; for the sake of simplicity, only in this FIG. 5 such a return spring 6' has been illustrated, even though, optionally, it should also be imagined in FIGS. 2 and 4, apart from the fact that it may also be provided in the embodiments to be explained in more detail hereinafter. This return spring 6' having the form of a helical compression spring is supported on the guide 21, on the one hand, which is part of a synthetic material body 22 (to be explained in more detail hereinafter) and on a part fixedly connected to the actuating part 6, on the other hand, here on the hood member 5 adjacent its connection to the actuating part 6; thereinstead, of course, the piston-shaped actuating part 6 could also have a radial projection or a collar below the connection site of the hood member 5, against which projection or collar the return spring 6' is rested; this, however, is not further illustrated in the drawing.

A further alternative regarding a structural detail which is shown in FIG. 5 differently from the preceding figures, consists in that the hood member 5 is integrally formed with the actuating part 6 in one piece instead of being connected thereto by positive fit; in detail, preferably the hood member 5 is injection-molded together with the actuating part 6 in one piece, particularly as a two-component injection-molded part.

Finally, as a further modification it is shown in FIG. 5 that the switching spring 12 may have a coating 18' of a noble metal that has good electric conductivity, preferably gold, in that region where the electric contact shall be made, i.e. in the region of the curved contact portion 18, said coating 18' causing a particularly good electric contact. Of course, this coating 18' may not only be present in a partial region of the switching spring 12, but the entire switching spring 12 may have an appropriate coating.

The guide 21 and the receiving seat 14 are part of the previously mentioned synthetic material body 22 which is formed by preliminarily injecting a thermoplastic resin around the conductors 3, 4. This preliminary or first injection-molding, i.e. the first synthetic material body 22, fixes the conductors 3, 4 relative to each other and constitutes a base body which is suitable to be handled for mounting of the switching spring 12 as well as of the hood member 5 including the actuating part 6 of the switch device 7. At the same time, this first injection-molded synthetic material body 22 forms a plane resting surface for the rim 23 of the hood member 5, this rim 23 projecting outwards from the hood body proper in flange-like manner, cf. FIGS. 4 and 5.

Finally, the hood member 5 is sealingly held and fixed with its rim 23 on the first injection-molded synthetic material body 22 by a finishing injection molding, i.e. a second injection-molded synthetic material body 24 which forms the housing 2; this second body 24 is formed during the injection-molding step such that, with one of its rims 25, it overlaps the rim 23 of the hood member 5 and the first injection-molded synthetic material body 22 located therebelow, yet with this rim 25 leaves an aperture for the hood member 5. On the other side, this second injection-molded synthetic material body 24 forms a bottom 26 as well as side walls 27 and a cover wall 28 of the housing 2. The bottom 26 has a thickness corresponding to the height of projections 29 of the first injection-molded synthetic material body 22 (cf. FIG. 3) which act as spacer elements during the second injection-molding step so as to keep the first injection-molded synthetic material body 22 together with the switching spring 12, actuating part 6 and hood member 5 at a predetermined distance from the neighboring wall of the mold cavity of the injection molding tool.

Figure 2:
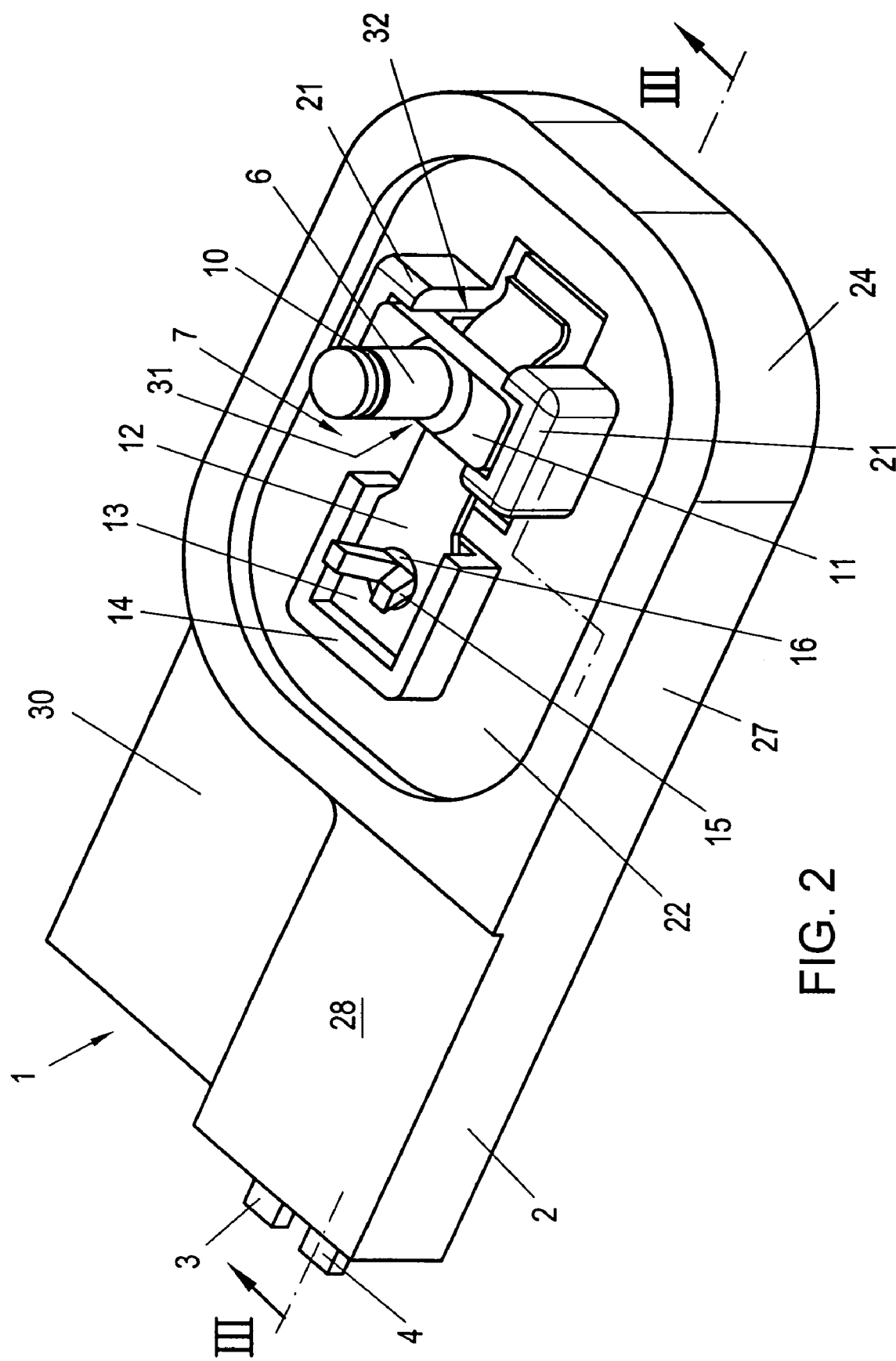
FIG. 2 is a comparable perspective illustration of this assembly, yet with the omission of a hood member that covers the switch device proper, so as to make the parts of the switch device visible.

From the drawing, e.g. FIGS. 1, 2 and 3, it can further be seen that the housing 2, i.e. the second injection-molded synthetic material body 24, furthermore has a clearance portion 30 having a stepped configuration.

The first injection-molded synthetic material body 22 and the second injection-molded synthetic material body 24 preferably also consist of a thermoplastic synthetic material, such as, e.g., PE, PA, POM, ABS or PMMA.

The assembly 1 described thus consists only of six parts, i.e. of the housing 2 which is formed by the second injection-molded synthetic material body 24, of the conductors 3, 4, which are fixed by the first injection-molded synthetic material body 22 and held therein by being embedded therein, of the first injection-molded synthetic material body 22 proper, of the switching spring 12, of the hood member 5, and of the actuating part 6.

As can particularly seen in FIG. 2, the guide 21 has passages 31, 32 for the switching spring 12, through which the switching spring 12 projects with its cantilevering part.

Optionally, the hood member 5 may be made of a transparent synthetic material so as to be able to visually check the switch activity.

If the conductors 3, 4 are provided on a printed circuit board, or on a flexible conductive track foil, the latter may, of course, also be equipped with further construction elements for obtaining electric functions which, however, is not further illustrated in the drawing. Moreover, the assembly 1 may have geometries different from that shown in the drawing, and in general the geometry will be determined by the respective purpose of use.

The assembly 1 described may particularly advantageously be used as a limit switch or micro-switch in motor vehicles, e.g. as a closure contact at doors etc.

During the production process, it is proceeded such that at first the conductors 3, 4 are formed, e.g. by structuring a printed circuit board or conductive track foil element, or by punching out a metal foil, in particular a copper foil, whereupon these conductors 3, 4 are fixed in an injection molding tool and injected around preliminarily with a synthetic material under formation of the first synthetic material body 22. Subsequently or simultaneously, the actuating part 6 is pre-mounted on the hood member 5, and after mounting of the switching spring 12 on the first injection-molded synthetic material body 22 by means of the arms 15 of the one conductor 3, and after laying the hood member 5 including the pre-mounted actuating part 6 on the first injection-molded synthetic material body 22, the structure thus obtained is, in a second injection-molding step, injected around with synthetic material for completion, wherein the rim 23 of the hood member 5 is embedded in the injection-molded material so as to achieve sealing of the assembly 1 against penetration of moisture, or water, respectively.

This mode of production will be explained in more detail hereinafter by way of FIGS. 9, 10 and 11 on a somewhat modified exemplary embodiment.

Instead of having the key-switch device 7, the previously described assembly 1 may also be designed such that the switch device 7 includes two fixed switching states, "on" and "off"; for this purpose, it is conceivable e.g. to design the projection 8 of the hood member 5 such that it can be turned inwards, wherein, in this turned-inward state, the switch is "on". When pressing the actuating part 6 further inwards, the switching spring 12 is pressed further downwards and biased more strongly, so that after releasing the actuating part 6, is will press the latter outwards again which such a high initial force that the energy of the actuating part 6 will suffice to press outwards in turn the inwardly turned projection 8 of the hood member 5, by overcoming a resistance acting against such deformation, i.e. to turn it outwards again.

The switching spring 12 may also be of a design such that after having achieved a certain deflection, it will snap over or change over so as to achieve the desired switching position with a tight abutment on the conductive track. For this purpose, the switching spring may have a curvature or bulge, with the snapping over occurring in this region.

Figure 6:
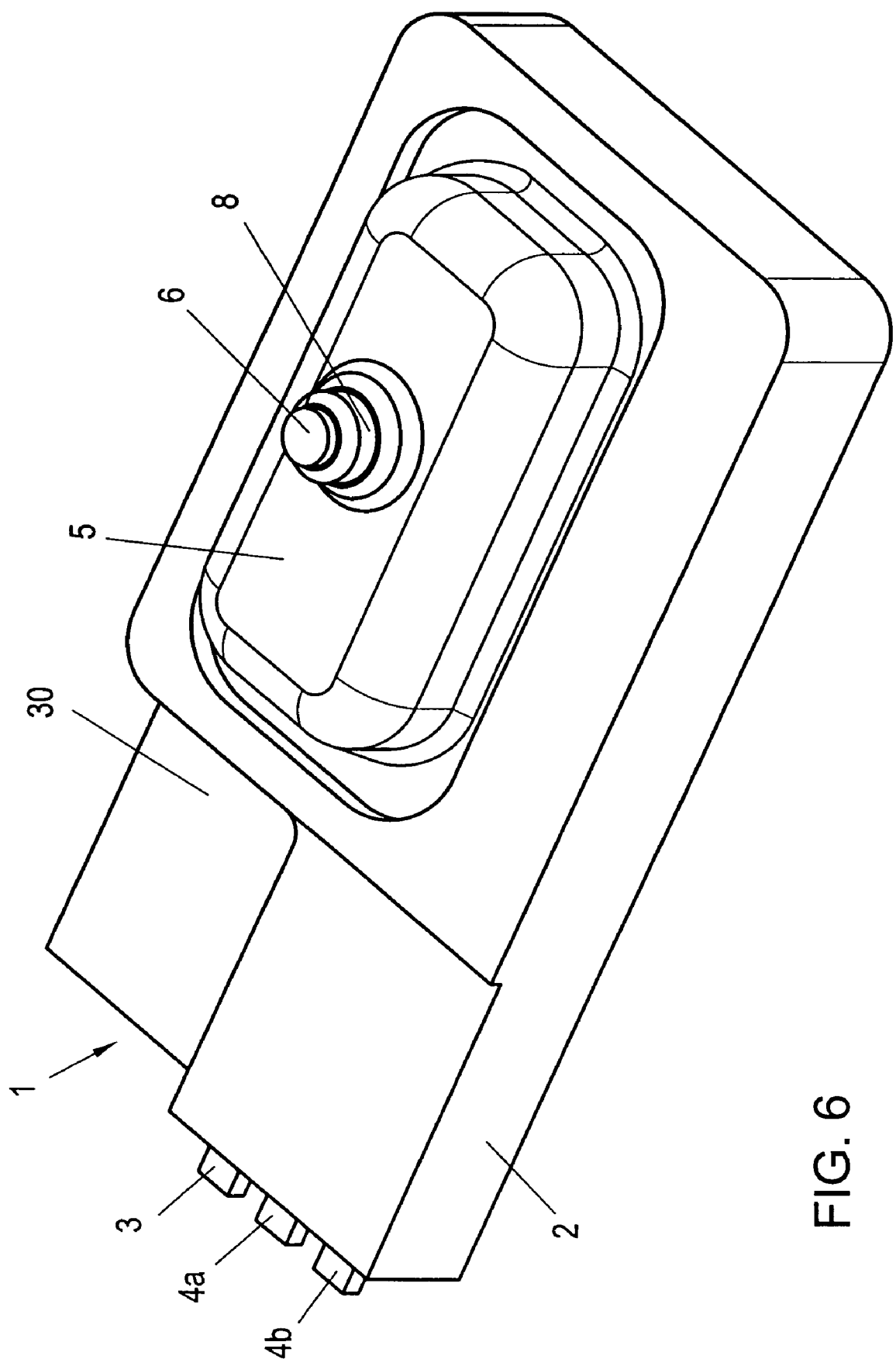
FIG. 6 in a view similar to that of FIG. 1 shows a modified exemplary embodiment of an assembly according to the invention, this assembly having a switch-over function.
Figure 7:
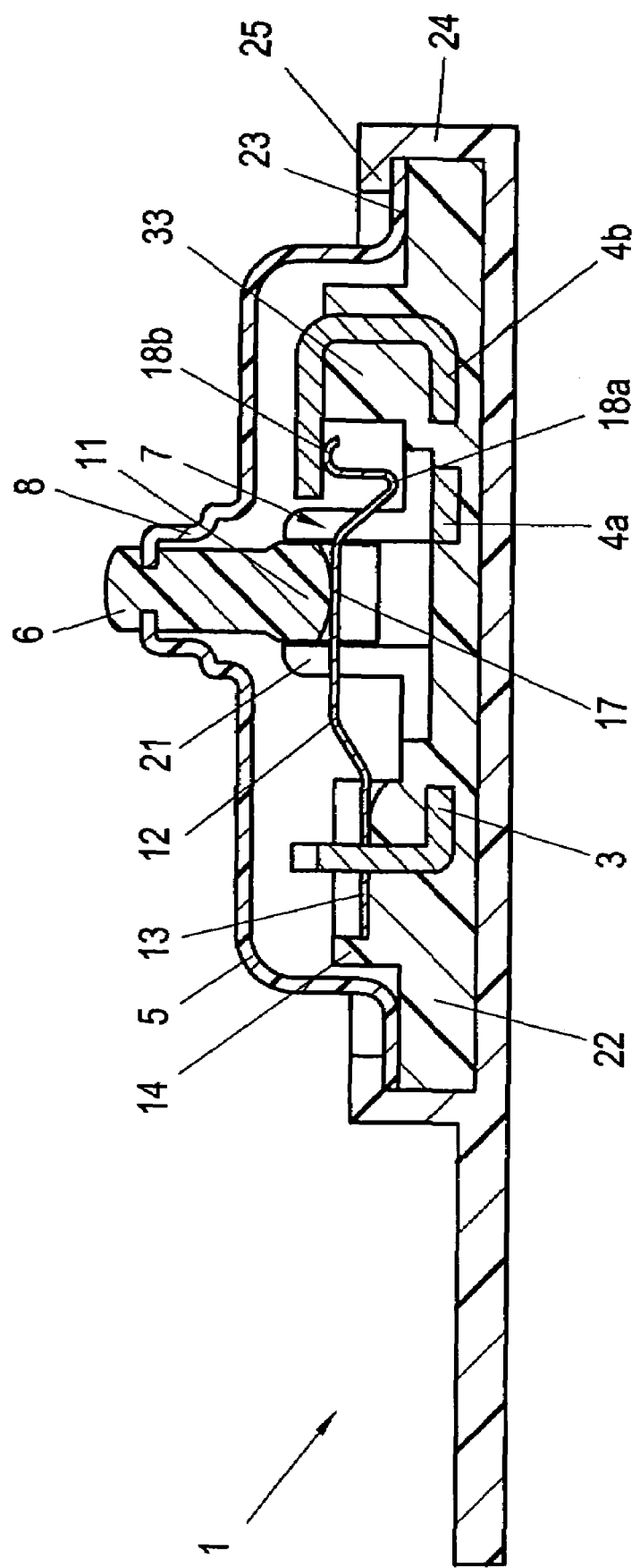
FIGS. 7 and 8 show the two switching positions of the assembly according to FIG. 6 in sectional representations similar to those of FIGS. 4 and 5.
Figure 8:
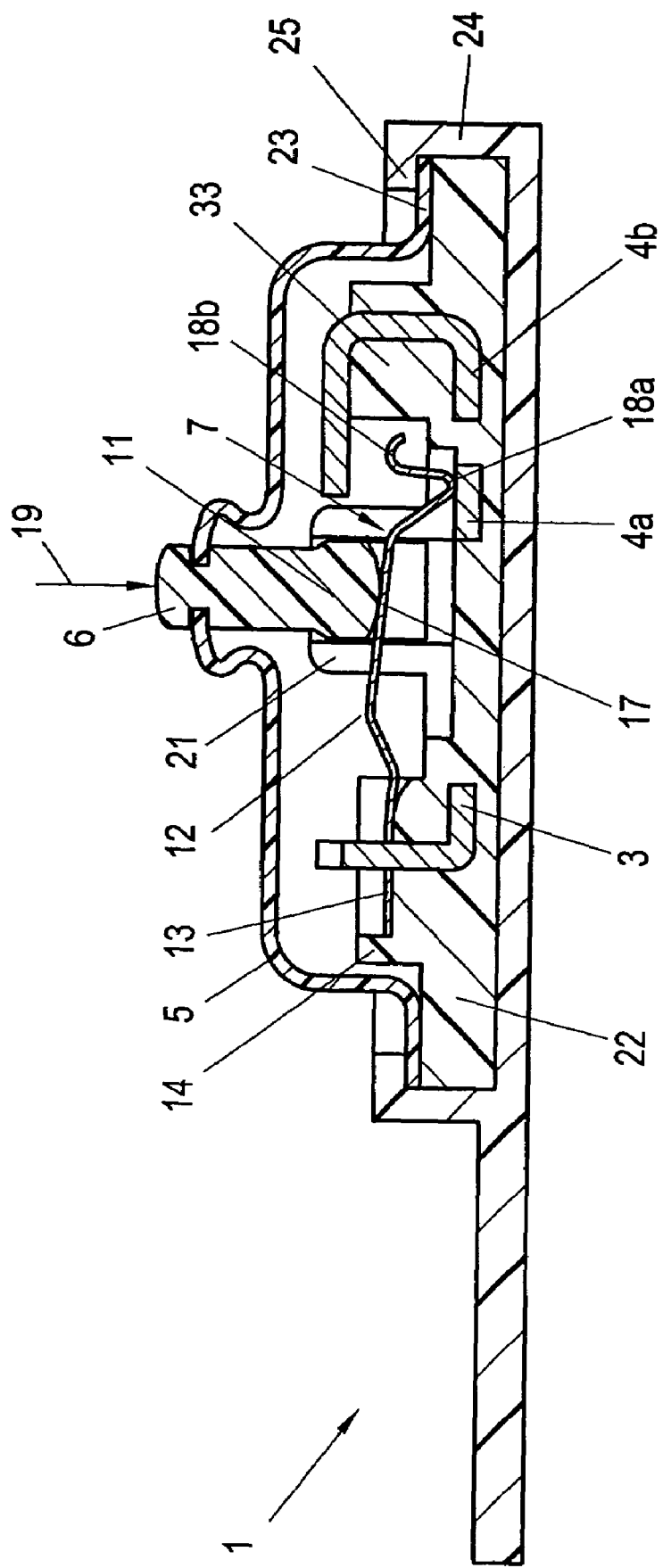

In FIGS. 6 to 11, a modified embodiment of the present switch assembly 1 is illustrated, this assembly now having two stable switching-states, by pressing inwards the actuating part 6, cf. arrow 19 in FIG. 8, for making an electric connection either to a conductor 4a (first state) or to a conductor 4b (second state, e.g. normal state). As far as the exemplary embodiment according to FIGS. 6 to 11 corresponds to the exemplary embodiment previously described by way of FIGS. 1 to 5, the same reference numerals have been used for corresponding components, and, to the extent to which the embodiment is like the former one, it need not be described again.

As has been mentioned, in the assembly 1 according to FIGS. 6 to 11, an electric connection is made to electrically connect conductors 3 either to a conductor 4a or to a conductor 4b, cf. also the switching states according to FIGS. 8 and 7, and accordingly, instead of two conductors 3, 4 according to FIGS. 1 to 5, three conductors 3, 4a, 4b are now embedded in the first injection-molded synthetic material body 22. Here, the one conductor 4a, to which a contact is made by means of the concave curved contact portion 18a at the end of switching spring 12 when pressing the actuation part 6 inwards (cf. FIG. 8), corresponds to conductor 4 in the embodiment according to FIGS. 1 to 5. In addition, the electric conductor 4b is provided, one end portion of which is turned over in U-shaped manner, cf. FIGS. 7 and 8, so as to be contacted from the bottom side by a further, end-side arcuate contact portion 18b of the switching spring 12 in the normal or at-rest position according to FIG. 7. This conductor 4b, too, is embedded in the first injection-molded synthetic material body 22, a supporting pedestal 33 being formed on the first injection-molded synthetic material body for supporting the bent upper end of the conductor 4b which is contacted at its lower side.

On the other hand, a receiving means 14 for the fastening part 13 of the switching spring 12, as well as a guide 21 for the guiding and pressure portion 11 of the actuating part 6 are formed on the synthetic material body 22, similar as in the embodiment according to FIGS. 1 to 5. The actuating part 6 again is mounted in the manner previously explained by way of FIG. 4 in the deformable projection 8 of the hood member 5 by positive-fit engagement of the aperture rim 9 in a groove 10 of the actuating part 6. When actuated, the lower bridge-type guiding portion 11 again presses downwards on a convex portion 17 of the switching spring 12 (cf. FIG. 8). Furthermore, the guide 21 again is designed with passages 31, 32, cf. FIGS. 9 and 10, through which the switching spring 12 can extend with its cantilevering part to the contact regions of the conductors 4a, 4b, cf. in particular FIG. 10.

Figure 9:
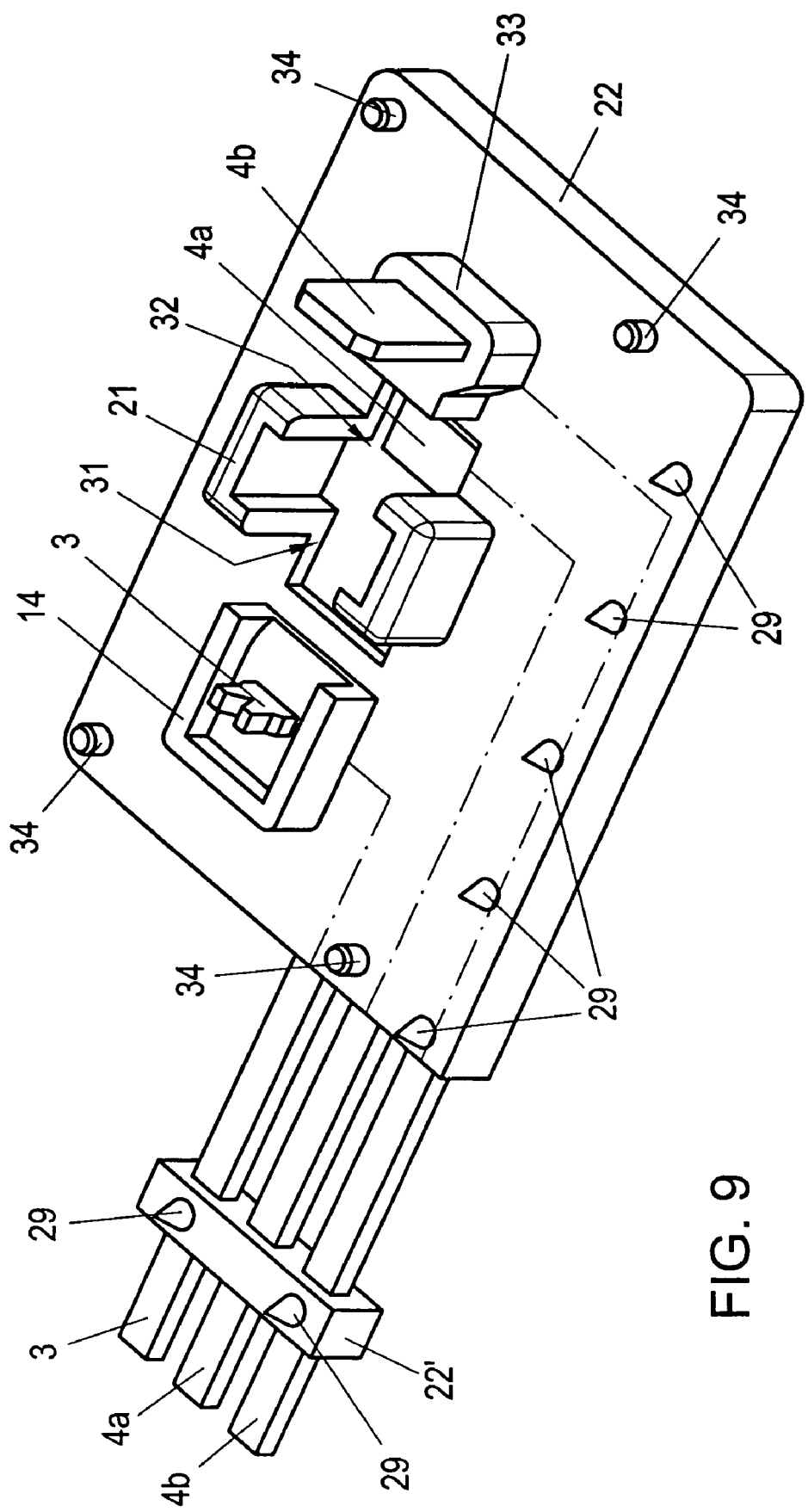
FIGS. 9, 10 and 11 show perspective views, similar to that of FIG. 6, of intermediate stages in the course of producing the assembly according to FIG. 6, i.e. after the first injection-molding step (FIG. 9), after the mounting of the switching spring (FIG. 10), and after the mounting of the hood member (FIG. 11), yet still before the second injection-molding step.

In FIG. 9, the state after the first injection-molding step in the course of producing the present assembly has been illustrated in detail, it being visible that the first injection-molded synthetic material body 22 is substantially plate-shaped, yet with the receiving seat 14, the guide 21 and the pedestal 33 being formed on its upper side. Moreover, it can be seen from FIG. 9 that during the first injection-molding process, close to the outer ends of the conductors 3, 4a, 4b, a part of the first injection-molded synthetic material body 22' is present which, there, fixes the strip-shaped conductors 3, 4a, 4b relative to each other in their position so as to prevent a deflection or bending of the conductors 3, 4a, 4b during the finishing second injection-molding process.

Besides, in FIG. 9 the course of the portions of the conductors 3, 4a, 4b within the first injection-molded synthetic material body 22 is indicated in dot-and-dash lines.

Figure 10:
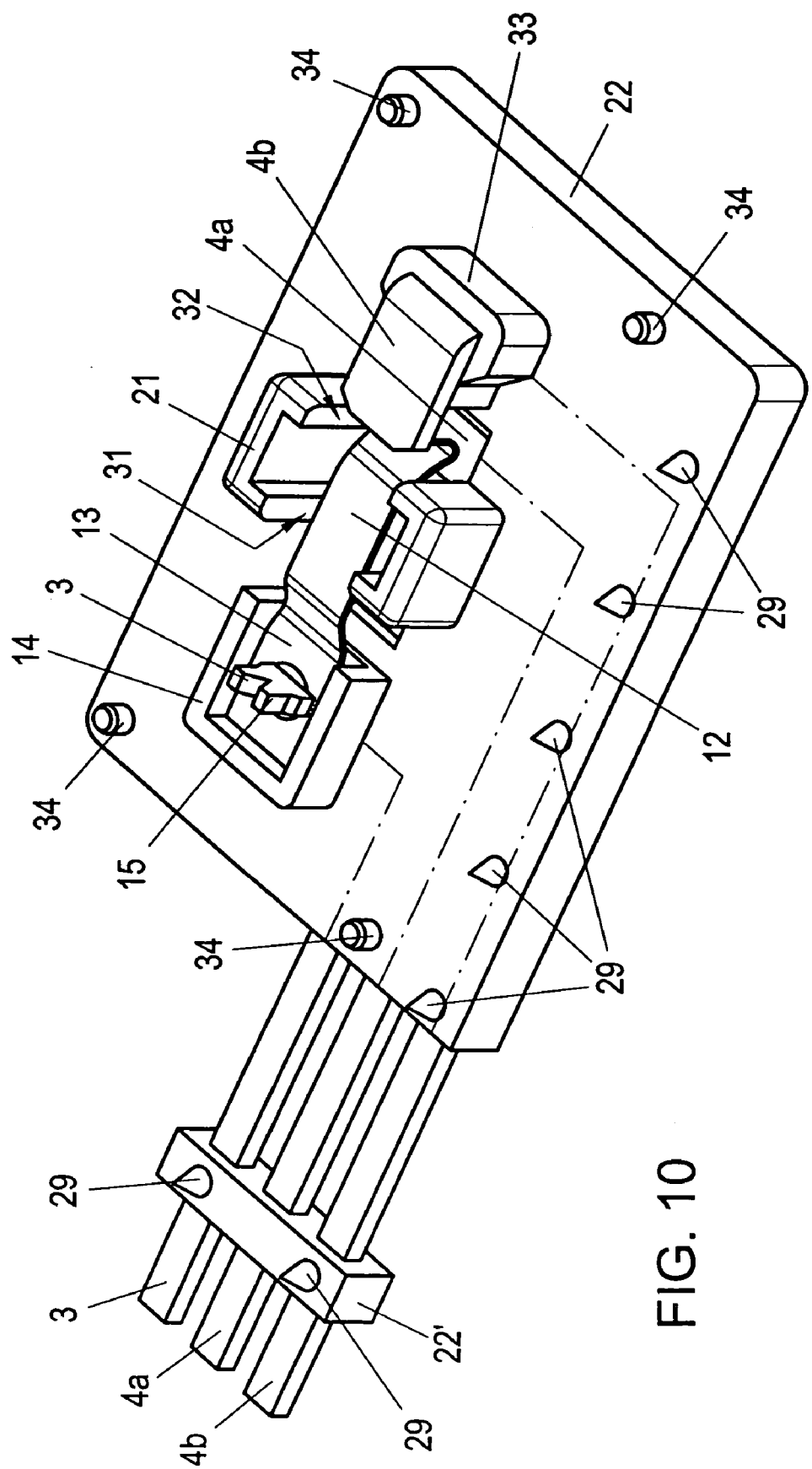
Figure 11:
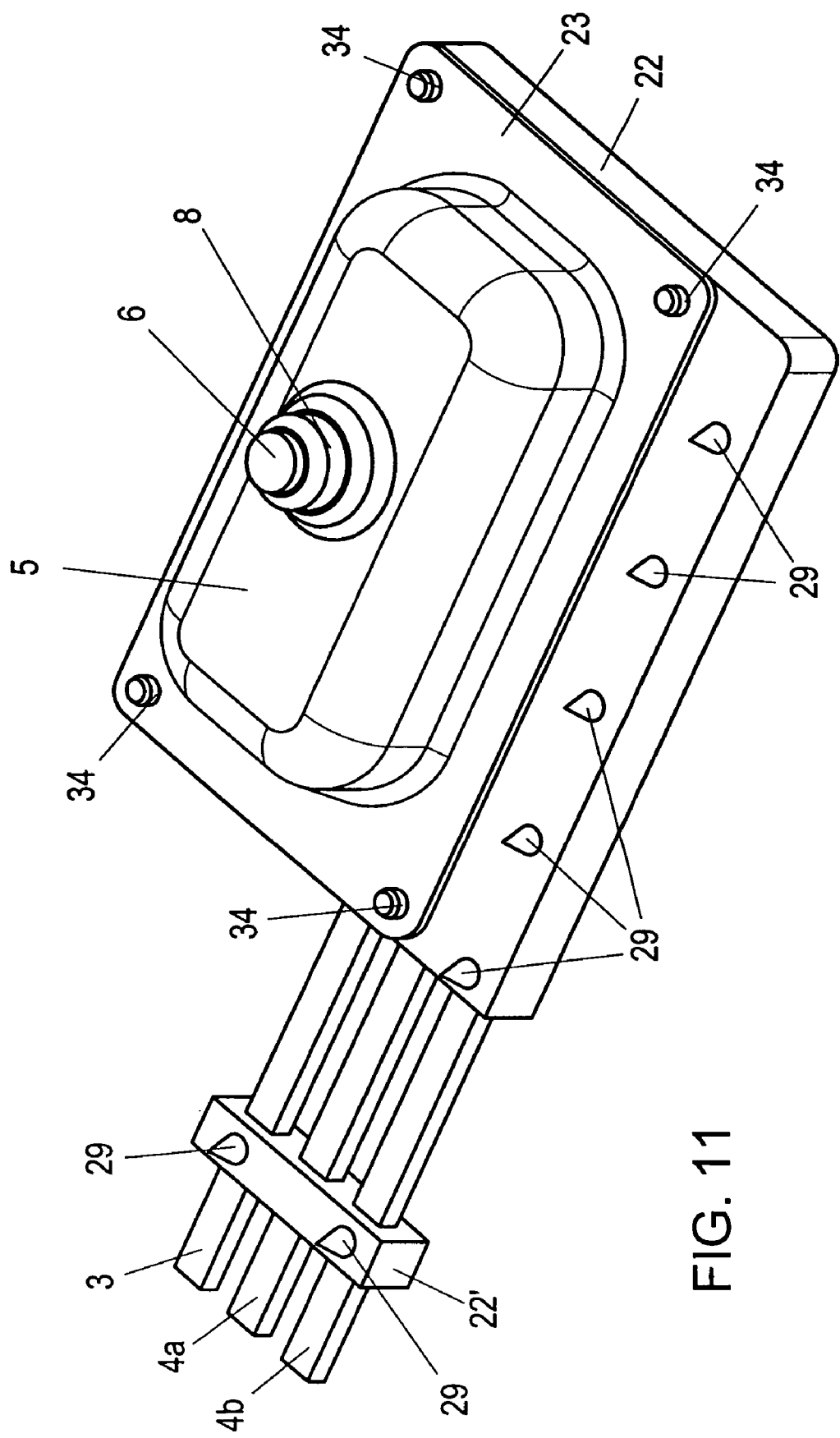

From FIGS. 9 and 10, moreover, top-side, e.g. conical, projections 29 serving as spacer elements, as has already been explained before in the context of FIGS. 1 to 5, as well as also pin-shaped projections 34 are visible; these pin-shaped projections 34 serve for positioning and fixing the hood member 5 which is mounted on the first injection-molded synthetic material body before the finishing injection-molding process, as can be seen from FIG. 11.

However, before the hood member 5 is mounted on the first injection-molded synthetic material body 22, the components of the switching means 7—here in the form of a change-over switch—are mounted. As can be seen from FIG. 10, by means of an aperture the switching spring 12 is slid over somewhat diverging arms 15 of the one conductor 3, similar as according to FIGS. 1 to 5, horizontal pivoting of the fastening part 13 in its plane being prevented by the configuration of the fastening part 13 as well as of the receiving seat 14, which configuration is non-round, in particular rectangular, seen in top-view; pushing the fastening part 13 off the conductor 3, however, is prevented by the diverging shape of the arms 15. After this mounting of the switching spring 12, the originally straight-upwardly projecting end part of the conductor 4b (cf. FIG. 9) is bent at a right angle, namely towards the left according to the illustration in FIGS. 9 and 10, so that it comes to lie above the end of the switching spring 12, cf. FIG. 10. Then the hood member 5, to which, as has already been explained above, the actuating part 6 has been previously mounted in the manner described, is arranged on the first injection-molded synthetic material body 22, with the positioning projections 34 extending through corresponding holes in the rim 23 of the hood member 5; with this, the state according to FIG. 11 has been reached. Subsequently, the structure thus obtained is subjected to the second injection-molding step, and is thus injected-around to completion, whereby finally, the assembly 1 according to FIGS. 6 to 8 is obtained. By means of the finishing injecting-around, a moisture-proof arrangement is obtained.

The sequence followed during the production of the assembly 1 according to FIGS. 1 to 5 is quite analogous, except that the conductor 4b and, thus, also the step of bending its end part, is omitted, apart from the fact that the synthetic material body 22 may also be formed without the supporting pedestal 33. Thus, it is not necessary to repeat the description for the production of the assembly 1 according to FIGS. 1 to 5.

Figure 12:
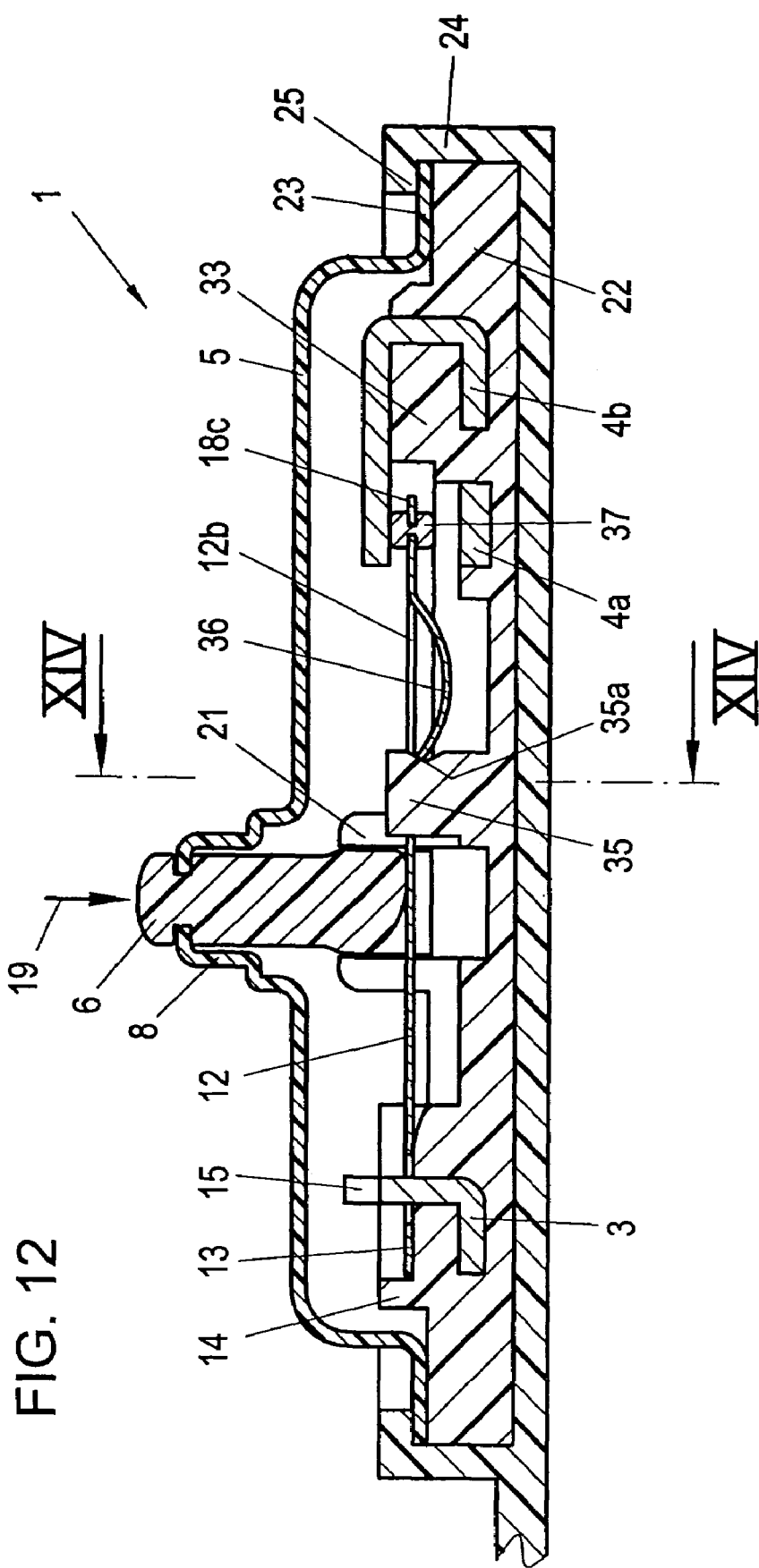
FIG. 12 shows a further embodiment of the assembly according to the invention in a sectional illustration similar to FIG. 7.
Figure 13:
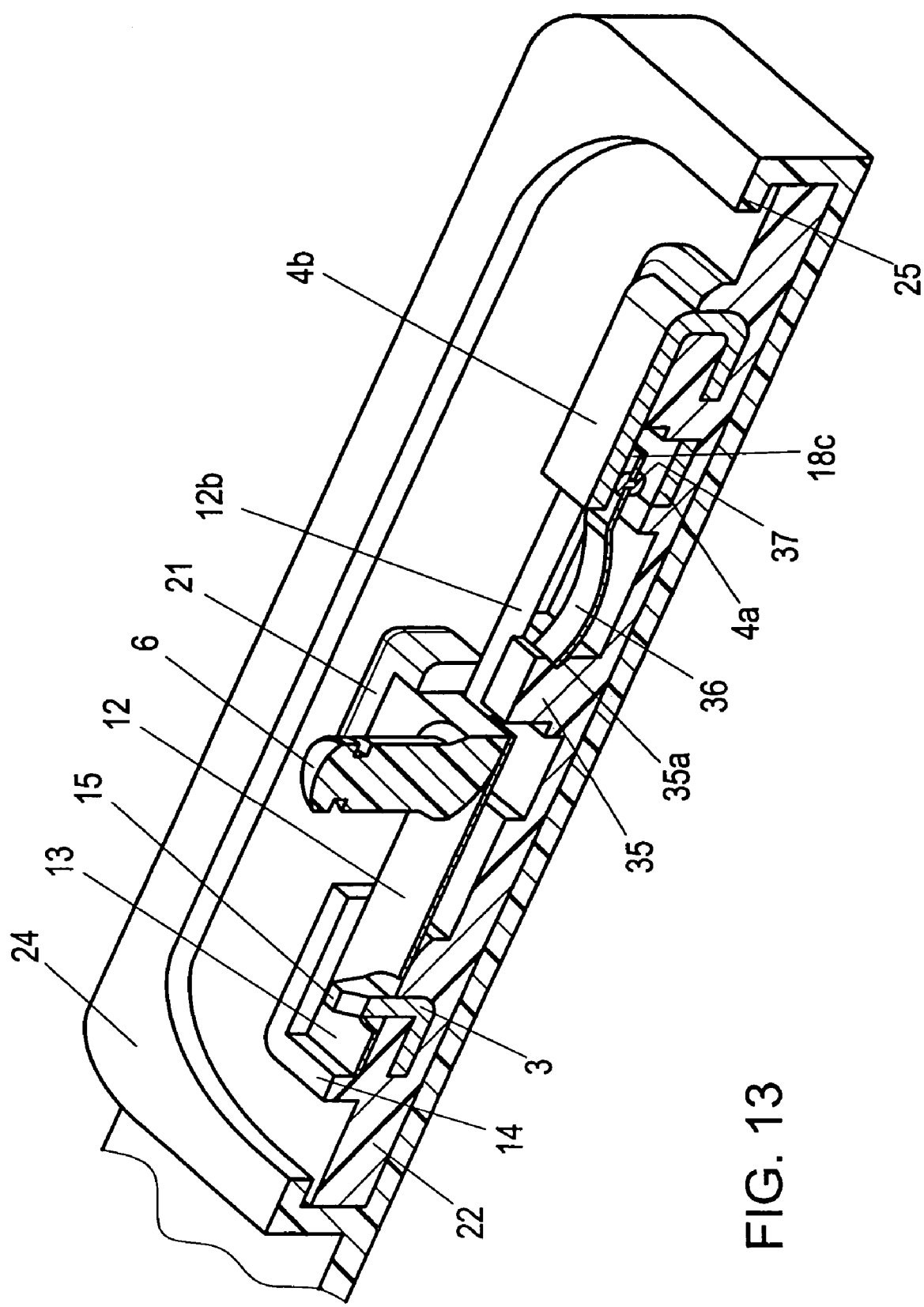
FIG. 13 shows a perspective, sectioned illustration of this assembly according to FIG. 12 in a view obliquely seen from above, wherein the hood member—similar as in FIG. 2—has been omitted.
Figure 14:
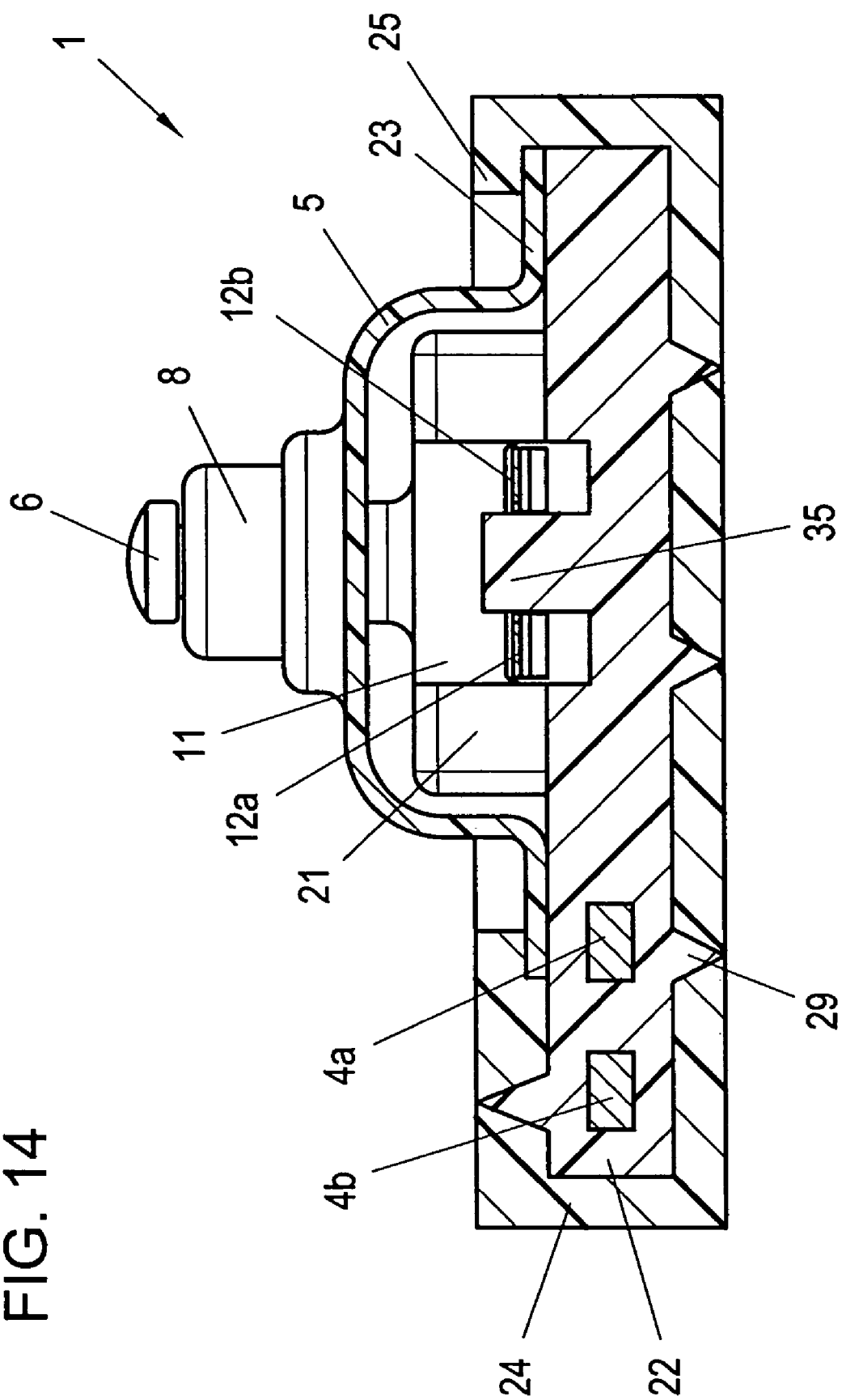
FIG. 14 shows a cross-section through this assembly according to line XIV-XIV of FIG. 12.

In FIGS. 12, 13 and 14, in a sectional representation similar to that according to FIG. 7, in a cut-away oblique view from the top as well as in a cross-section, a further switch assembly 1 is shown which substantially corresponds to that according to FIGS. 6 to 11, so that it is not necessary to describe the corresponding details once more, also as regards their production, and in the following only the differences of the assembly 1 according to FIGS. 12 and 13 as compared to that according to FIGS. 6 to 11 shall be explained.

FIGS. 12 to 14 show an embodiment of the switching spring 12 with a snapping-over feature for switching over the electric connection between the conductive tracks 4a and 4b. In detail, again, the switching spring 12 which is held also here with its rear, endside fastening part 13 in the receiving seat 14 by straddled arms 15 of the conductive track 3, is perforated or punched out, respectively, starting approximately from the middle thereof, i.e. on the other side, viewed from the fastening part 13, of the piston actuating part 6 which, again, is held in an elastic projection 8 of the hood member 5, two lateral spring arms 12a, 12b being formed which continue to extend along a straight line laterally of a supporting projection 35; between these spring arms 12a, 12b, there is a cleared tongue-shaped, concavely arched bow portion 36 of the switching spring 12, which, at the cantilevering front end 18c of the switching spring 12, is connected to the rest of the switching spring 12, in particular to the spring arms 12a, 12b thereof. The supporting projection 35 has a notch 35a in which the bow portion 36 is supported by its free rearward end. At the front end 18c of the switching spring 12, a contact knob 37 is provided which may e.g. be produced separately and may for instance be mounted by riveting.

When actuating the switching assembly 1, i.e. when pressing down the piston-like actuating part 6 according to arrow 19, the switching spring 12 is pressed downwards, wherein at first the arcuate portion 36 of the switching spring 12 will still remain in its supported, biased position illustrated. After a dead center of the switching spring 12, defined by the bias, or curvature, respectively, of the arcuate portion 36, has been overcome during the downward movement, the—according to the illustration in FIGS. 12 and 13—right-hand part of the switching spring 12 will snap downwards, so that the contact knob 37, instead of contacting the upper, bent conducting track or conductor 4b, will now come to abut on the lower conductive track or conductor 4a. With this, the desired switch-over procedure is realized in the course of this snapping-over of the switching spring 12.

As can be seen from FIG. 12, the supporting projection 35 preferably is part of the first injection-molded synthetic material body 22, and on this first injection-molded synthetic material body 22, in turn, the hood member 5 is applied with its rim 23, as has already been described before, and is fixed and sealed during the finishing second injection-molding step by the rim 25 of the second injection-molded synthetic material body 24.

What is claimed is:

1. An assembly having an electric switching function and comprising:
   a switch device provided in a housing member and associated to electric conductors, and having a movable actuating part;
   a sealing hood member mounted to the actuating part;
   wherein the sealing hood member has a rim portion mounted on a first injection-molded synthetic material body which fixes and partially encloses the electric conductors, and wherein the sealing hood member is sealingly connected to the first injection-molded synthetic material body by means of a second injection-molded synthetic material body that, by being injected around, both covers the rim portion of the hood member and also adjoins the first injection-molded synthetic material body.

2. An assembly according to claim 1, wherein the hood member comprises an aperture through which the movable actuating part extends under sealed conditions.

3. An assembly according to claim 2, wherein the actuating part is plunger-like shaped and has a circumferential groove, the hood member having a rim around said aperture which sealingly engages into said groove.

4. An assembly according to claim 1, wherein the first injection molded synthetic material body constitutes a guide for the actuating part.

5. An assembly according to claim 4, wherein the actuating part includes a guiding portion which is non-round, seen in top view, and has the shape of a bridge, and wherein the guide is interrupted in alignment with the space beneath the bridge, to form a passage.

6. An assembly wherein the first injection-molded synthetic material body forms a receiving seat for a rear part of a metallic switching spring of the switch device when dependent on claim 5, wherein the switching spring projects in cantilevering manner from its receiving seat through the passage in the guide so as to be able to contact at least one of the electric conductors.

7. An assembly according to claim 5, wherein the switching spring has a convex portion which abuts the lower side of the bridge-shaped guiding portion.

8. An assembly according to claim 6, wherein the switching spring has a convex portion which abuts the lower side of the bridge-shaped guiding portion.

9. An assembly according to claim 6, wherein the switching spring has a cantilevering end comprising at least one curved portion.

10. An assembly according to claim 1, wherein the first injection-molded synthetic material body forms a receiving seat for a rear part of a metallic switching spring of the switch device.

11. An assembly according to claim 10, wherein the switching spring by means of its rear part that is located in the receiving seat is electrically connected to another one of the electric conductors.

12. An assembly according to claim 10, wherein the switching spring comprises an arched portion which, when actuated by the actuating part, is capable of being snapped over when having reached a dead center.

13. An assembly according to claim 12, wherein the arched portion of the switching spring is tongue-shaped and has two ends, and is supported on a supporting projection by one of its ends.

14. An assembly according to claim 10, wherein the switching spring has a separate switching knob for contacting at least one of the electric conductors.

15. An assembly according to claim 10, wherein the switching spring has a coating of noble metal.

16. An assembly according to claim 15, wherein the noble metal is gold.

17. An assembly according to claim 1, wherein the hood member and the actuating part are integrally formed in one piece.

18. An assembly according to claim 17, wherein the hood member and the actuating part are formed as a two-component injection-molded part.

19. An assembly according to claim 1, wherein the actuating part has an associated return spring.

20. An assembly according to claim 19, wherein the return spring is a helical compression spring surrounding the actuating part and resting on the first injection-molded synthetic material body, on the one hand, and on one of the actuating part and a part fixedly connected thereto, on the other hand.

21. An assembly according to claim 20, wherein the compression spring rests on the hood member which is connected to the actuating part.

22. A method of producing the an assembly having the electric switching function as claimed in claim 1, wherein in a first injection-molding step, the electric conductors are injection-mold-embedded in a synthetic material so as to fix them in the first injection-molded synthetic material body, whereupon the switch device comprising the movable actuating part as well as the sealing hood member attached to the actuating part, and surrounding the former, is arranged on the first injection-molded synthetic material body which fixes the conductors, whereafter at least that region where the hood member, with the rim portion thereof rests on the first injection-molded synthetic material body, is embedded in a second injection-molding step, so as to form the second injection-molded synthetic material body connected to said first injection-molded synthetic material body.

23. A method according to claim 22, wherein the first injection-molding step comprises the step of injection-molding a guide for the actuating part of the switch device.

24. A method according to claim 22, wherein the first injection-molding step comprises the step of injection-molding a receiving seat for a metallic switching spring of the switch device.

25. A method according to claim 22, wherein the second injection-molding step comprises the step of injection-molding a housing having a bottom, sidewalls as well as a cover wall having an aperture through which the hood member projects.

26. A method according to claim 22, wherein the actuating part of the switch device is pre-mounted to the hood member, and the hood member together with the actuating part is mounted on the first injection-molded synthetic material body before the second injection-molding step.

* * * * *